Patented June 3, 1930

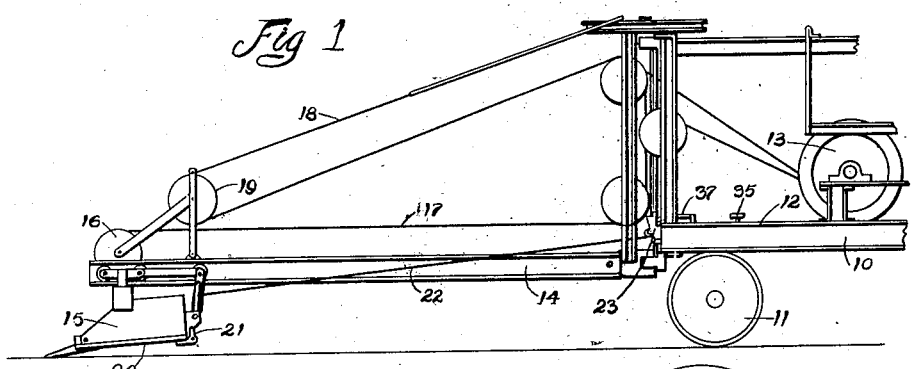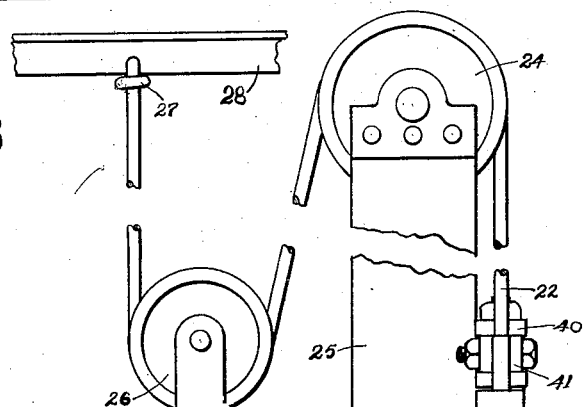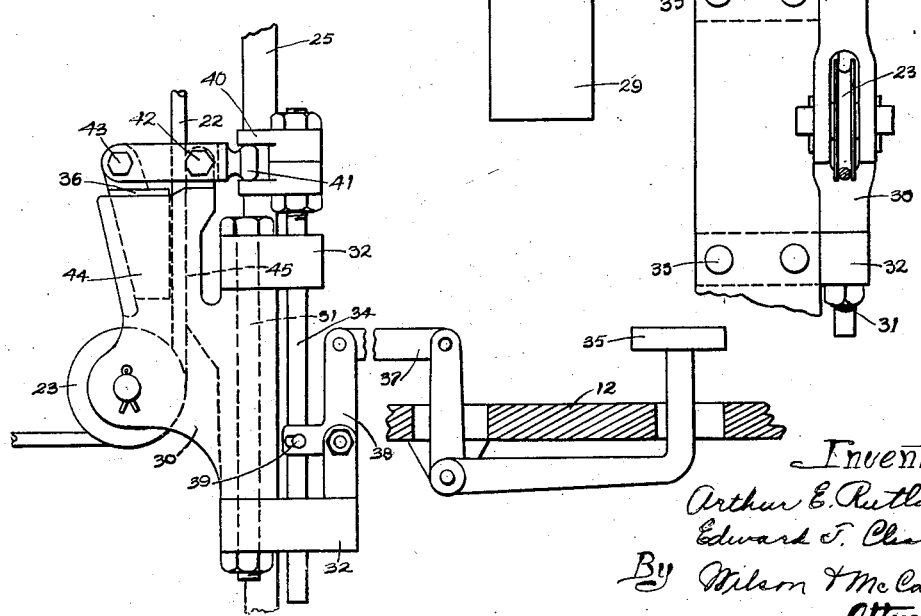

1,761,052

UNITED STATES PATENT OFFICE

ARTHUR E. RUTLEDGE AND EDWARD T. CLEARY, OF ROCKFORD, ILLINOIS

TRIP DEVICE

Application filed January 19, 1927. Serial No. 161,985.

This invention relates to power shovels and has for its principal object the provision of a trip device which is simple in construction, and positive and thoroughly practical in its operation.

According to the present invention we have provided in connection with the dump cable a slack take-up which permits freedom of movement of the shovel with the cable held under a slight normal tension and following the movements of the shovel, and utilize a cable clamping or gripping device disposed between the take-up and the shovel to hold the cable at any point in the movement of the shovel so that the latch thereof is released. This form of trip is designed to be controlled by the operator on the machine who also controls all of the other operations of the shovel, and enables dispensing with the services of an additional man to dump the shovel, thus avoiding the necessity for team work between an operator and the extra attendant which was otherwise involved and which made the operation of the shovel necessarily awkward and slower.

The invention is illustrated in the accompanying drawing wherein—

Figure 1 is a more or less diagrammatic view of a steam shovel equipped with our novel trip device;

Fig. 2 is a side view of the trip device showing the means operable by a foot pedal to release the latch; and Fig. 3 is a front view of Fig. 2 showing, in addition, the means employed for taking up slack in the dump cable.

The same reference numerals are applied to corresponding parts in the three views.

The present invention is applicable to practically any type of power shovel wherever the releasable latch of the shovel was otherwise ordinarily operated by a dump cable under the control of an attendant or arranged to be pulled by the operator himself. Where the operator had to pull the cable the operation of the shovel was necessarily slow, and where a special attendant was employed for this purpose the pulling of the cable had to be timed in proper relation to the movement of the shovel controlled by the operator on the machine. In the latter case there was consequently a need for considerable team work on the part of the two men if the operation of the shovel was to be efficient, but despite the best of cooperation between the two men there was bound to be a certain amount of delay or confusion. In other words, where everything is taken into consideration it is preferable to have one man control and this is made entirely feasible by the present invention and actual practice has shown that the output of a machine equipped in accordance with our invention is greatly increased. There is also a considerable saving in labor cost since there is one less attendant per machine. The invention is herein illustrated as applied to a steam shovel although practically any other type would serve for the present purposes. Furthermore, the type of scoop or shovel employed in connection with the machine is hardly of importance and while the present invention shows the use of a skimmer scoop, a ditching scoop or any other type of shovel might be illustrated as the invention is applicable to practically any type of shovel wherever a releasable latch or other similar means is employed for dumping the same.

The machine illustrated comprises the usual frame 10 provided with wheels 11 for the support and mobility thereof. An operator's platform is provided on the frame at 12. The usual control levers (not shown) are disposed within convenient reach of the operator standing on the platform, the control levers being associated with the usual winding drum shown at 13. A swingable boom 14 carries a shovel 15 commonly referred to as a skimmer scoop by reason of its being ordinarily operated horizontally with a crowding thrust. The sheave 16 at the outer end of the boom has a hauling cable 17 operating over the same and connected with the shovel to move it back and forth on the boom. A cable 18 operating over another sheave 19 serves to hoist the boom as, for example, when the shovel is to be dumped, and the boom is arranged to be swung laterally by the operator bearing on the right or left hand side of a foot pedal (not shown) on the platform 12. The shovel has a dump bottom 20 arranged to open to the rear in the usual manner but normally held closed by a releasable latch 21 of any well known or preferred type such, for example, as the cam and shaft type. The latch 21 has a dump cable 22 connected therewith arranged when pulled to release the latch so as to dump the shovel. As stated above the cable 22 was heretofore extended off to one side of the machine to be pulled by a special attendant employed for this purpose, or else the cable was extended to the platform of the machine to be pulled by the operator. According to our invention, however, the cable is extended back alongside the boom to the machine where it is passed over a pulley 23 and thence upwardly for threading over another pulley 24 carried on the upper end of an upright 25. The cable leaving the pulley 24 extends downwardly for passage beneath a floating pulley 26 and thence upwardly for fixed connection, as at 27, with a stationary element 28 provided on the frame-work of the machine. The upright 25 is preferably at the front end of the operator's platform 12 where it is out of the way. This disposition of the upright also locates the slack take-up pulley 26 where it is convenient for the operator to reach either one of the laps of the cable 22 passing beneath the pulley. Thus, if the trip device to be presently described in detail fails for any reason to dump the shovel, the operator may pull the cable by hand and cause the shovel latch to be released. It will be noted that the take-up pulley 26 bears a weight 29 which serves to keep the cable under a slight normal tension so that it permits freedom of movement of the shovel without releasing the latch except when the trip device is operated or when the operator pulls the cable by hand.

The pulley 23 is mounted in a yoke 30 swiveled on a bolt 31 relative to the upright 25. The swiveling of the pulley is for the purpose of properly guiding the dump cable to the slack take-up means in any position which the boom 14 may occupy in the operation of the shovel. Two cleats 32 receive the bolt 31 and are fastened as by means of rivets 33 to the upright 25. The cleats 32 also provide guides for a plunger rod 34, the reciprocation of which by means of a foot pedal 35 serves to operate a cable gripping or clamping shoe 36. The pedal 35 projects above the platform 12, as indicated, and is in the form of a bell crank connected by means of a link 37 with a bell crank 38 connected, as at 39, with the plunger rod 34. The upper end of the plunger rod has a yoke 40 thereon for oscillating a lever or rocker arm 41 in the reciprocation of the rod. The lever 41 is pivoted at 42 on the yoke 30 and has pivotal connection at 43 with the shoe 36. The oscillation of the lever 41 serves to move the shoe 36 in or out from a guideway 44 through which the cable 22 passes, the lever 41 being operable by the yoke 40 in any position to which the yoke 30 may be swung with the pulley 23. The disposition of the inner end of the lever 41 on the axis of the bolt 31 maintains this operative relationship. It will be noted that the shoe 36 is wedge-shaped to correspond with the taper of the side wall of the guideway 44 so that the shoe is arranged to exert a wedging action when moved into the guideway and clamp the cable 22 firmly between the shoe and the adjacent wall 45 of the guideway.

In operation, when the shovel is to be dumped it is caused to move outwardly on the boom and at the proper interval, when the shovel is over a truck or other suitable receptacle, the operator depresses the pedal 35. The shoe 36 is thereby moved downwardly in the guideway 44. The cable is thus gripped and the continued movement of the shovel outwardly causes the release of the latch 21 in what is believed to be an obvious manner. The fact that the cable 22 is traveling downwardly through the guideway 44 when the shovel is moving outwardly on the boom at the time it is to be dumped obviously facilitates the wedging action of the shoe and a slight pressure on the foot pedal 35 is found to suffice to dump the shovel. The weight of the yoke 40 and its plunger rod 34 is found to be sufficient under ordinary circumstances to withdraw the shoe when pressure on the pedal 35 is relieved. However, a spring or other suitable means may be employed for insuring the withdrawal of the shoe after the shovel has been dumped. After the dumping operation the shovel is closed in the usual manner by a quick back and forth movement of the shovel which suffices to throw the bottom back into position, as is well known in this art.

It is believed that the foregoing description conveys a clear understanding of our invention. It should be understood, however, that this disclosure is merely for the purposes of illustration and that changes might be made in the construction and arrangement of parts without departing from the spirit and scope of the invention as expressed in the appended claims.

We claim:

1. A trip device for a power shovel comprising in combination with a frame and a shovel carrying boom swingably mounted with reference to the frame, the said shovel having a releasable latch with a dump cable connected thereto and extending to the frame, of a support mounted on said frame, a pulley bracket swiveled on said support and having the aforesaid cable passing over its pulley and through a guide opening adjacent the pulley, a shoe operated in said guideway for gripping the cable, a rocker arm pivotally mounted on the bracket and connected with the shoe to operate the latter, and means for operating said rocker arm comprising a plunger slidably mounted on said support, said plunger having a yoke providing a connection with one end of said rocker arm, the yoke and the end of the rocker arm being disposed approximately on the axis about which the pulley bracket is arranged to swivel, and means for reciprocating said plunger.

2. A structure as set forth in claim 1 wherein the yoke and plunger are arranged due to their own weight to drop to a position holding the shoe in an inoperative position, said parts being arranged to be raised to operative position.

3. A trip device for a power shovel comprising in combination with a frame and a shovel carrying boom swingably mounted with reference to the frame, the said shovel having a releasable latch with a dump cable connected thereto and extending to the frame, of a support mounted on said frame, a pulley carried by said support having the aforesaid cable passing over the same and through an adjacent guideway, a shoe operated in said guideway arranged to grip the cable, a rocker arm pivotally mounted on the support and connected with the shoe to operate the same, and means for operating the rocker arm including a treadle on said frame.

4. A structure as set forth in claim 3 wherein the shoe normally occupies a retracted position and the treadle normally occupies a raised position, the treadle being so connected with the shoe that the latter is advanced to operative position in the guideway when the treadle is depressed.

5. In a power shovel, a frame, a boom therefor, swingable laterally and vertically relative to the frame, a shovel movable back and forth on the boom and having a releasable latch for dumping the same, means for operating the shovel either way along the boom, a dump cable connected with said latch for releasing the same in the movement of the shovel, means on said frame for taking up slack in said cable in the movement of the shovel in operation, whereby the cable is kept under a substantially constant tension, not enough to release the latch at any point in the travel of the shovel, and means on the frame between the takeup and the shovel for gripping the cable at any desired point in the movement of the shovel whereby to operate the latch and dump the shovel, said means comprising a pulley bracket swivelled on said frame on a vertical axis to swing laterally with the boom and having the aforesaid cable passing over its pulley and through a guideway provided on said bracket adjacent the pulley, a shoe operated in said guideway for gripping the cable, a rocker arm pivotally mounted on the bracket and connected with the shoe to operate the same, and means on said frame including a treadle arranged for depression with the foot for operating said rocker arm, said means having an operating connection with one end of said rocker arm allowing the same to swing laterally with the bracket without disturbing said connection.

6. In a power shovel, a frame, a boom therefor swingable laterally and vertically relative to the frame, a shovel movable back and forth relative to the boom and having a releasable latch for dumping the same, means for operating the shovel, a dump cable connected with the latch for releasing the same in the movement of the shovel, means on said frame for taking up slack in the cable and maintaining the same under a substantially constant tension, a guide pulley for the cable mounted on the frame at the inner end of the boom having the bracket therefor swiveled on the frame for swinging movement laterally with the boom, cable gripping means on the pulley bracket arranged to swing laterally therewith, and means on the frame including a treadle arranged for depression with the foot for operating the cable gripping means, the two latter means having an operating connection constructed to permit the relative swinging movement of the cable gripping means with respect to the other means.

7. A trip device for a power shovel comprising in combination with a frame and a shovel carrying boom swingably mounted on the frame, for movement fore and aft or from side to side relative to the frame, the said shovel having a releasable latch with a dumping cable connected thereto and extending to the frame, of a slack take-up on the frame to which the cable is extended, a guide through which the cable extends to the take-up, cable gripping means associated with said guide, a treadle mounted on the frame, means providing a mechanical operating connection between said treadle and the cable gripping means, a guide pulley over which the cable extends to the guide, and a support for said pulley swingably mounted on the frame on a vertical axis to permit the pulley to swing from side to side relative to the frame in the side to side movement of the boom, whereby to direct the cable to the guide in any position of the boom.

In witness of the foregoing we have hereunto affixed our signatures.

ARTHUR E. RUTLEDGE.
EDWARD T. CLEARY.